(12) United States Patent
Hsieh et al.

(10) Patent No.: US 10,844,245 B2
(45) Date of Patent: Nov. 24, 2020

(54) VACUUM ENABLED ARTICLE TRANSFER

(71) Applicant: NIKE, Inc., Beaverton, OR (US)

(72) Inventors: Chia-Hung Hsieh, Dacun Township (TW); Chun-Ta Huang, Dacun Township (TW); Chiung-Lung Lin, Lukang Township (TW)

(73) Assignee: NIKE, Inc., Beaverton, OR (US)

( * ) Notice: Subject to any disclaimer, the term of this patent is extended or adjusted under 35 U.S.C. 154(b) by 284 days.

(21) Appl. No.: 15/835,335

(22) Filed: Dec. 7, 2017

(65) Prior Publication Data

US 2018/0100087 A1    Apr. 12, 2018

Related U.S. Application Data

(63) Continuation of application No. 14/463,115, filed on Aug. 19, 2014, now Pat. No. 9,850,404.

(Continued)

(51) Int. Cl.

| | | |
|---|---|---|
| *C09J 5/00* | (2006.01) | |
| *B05C 1/02* | (2006.01) | |
| *B05D 1/28* | (2006.01) | |
| *B05C 1/08* | (2006.01) | |
| *B05C 1/00* | (2006.01) | |
| *B05C 13/02* | (2006.01) | |
| *B65G 21/20* | (2006.01) | |

(52) U.S. Cl.
CPC ........ *C09J 5/00* (2013.01); *B05C 1/02* (2013.01); *B05C 1/08* (2013.01); *B05C 13/02* (2013.01); *B05D 1/28* (2013.01); *B65G 21/2036* (2013.01); *B05C 1/003* (2013.01); *B05C 1/027* (2013.01)

(58) Field of Classification Search
CPC .................. B42C 9/0043; B42C 9/0012
See application file for complete search history.

(56) References Cited

U.S. PATENT DOCUMENTS 3,353,517 A    11/1967    Tower
3,372,826 A *  3/1968    Heaton ............... B65D 23/001
                                                     215/12.1

(Continued)

FOREIGN PATENT DOCUMENTS

CN    204727252 U    10/2015
DE    2939102 A1    4/1981

(Continued)

OTHER PUBLICATIONS

Office Action dated May 28, 2019 in European Patent Application No. 15727157.8, 6 pages.

*Primary Examiner* — Francisco W Tschen
(74) *Attorney, Agent, or Firm* — Shook, Hardy & Bacon LLP (57) ABSTRACT

Moving an article after a material, such as a hot-melt adhesive, has been applied to a surface of the article is accomplished with an article transfer apparatus. The apparatus is comprised of a belt having a plurality of apertures extending there through that are effective to communicate a vacuum pressure from an inner surface of the belt to a contacting surface of the belt. The vacuum pressure secures and adheres the article to the contacting surface of the belt as the belt conveys the article. The vacuum pressure is distributed along the inner surface of the belt by a vacuum chamber, which is between a compression roller and a second roller.

14 Claims, 5 Drawing Sheets

Related U.S. Application Data (60) Provisional application No. 62/031,383, filed on Jul. 31, 2014.

(56) References Cited

U.S. PATENT DOCUMENTS

| | | | |
|---|---|---|---|
| 3,477,558 A | | 11/1969 | Fleischauer |
| 3,659,840 A | | 5/1972 | Ruck |
| 3,841,687 A | * | 10/1974 | Banyas .................. B07C 5/122 |
| | | | 294/186 |
| 4,141,462 A | * | 2/1979 | Rucci ................ B65D 43/0218 |
| | | | 220/254.1 |
| 4,286,870 A | | 9/1981 | Silverberg |
| 4,290,837 A | | 9/1981 | Bova |
| 4,291,974 A | | 9/1981 | Silverberg |
| 4,310,576 A | * | 1/1982 | Hesselmann ......... B42C 9/0012 |
| | | | 118/210 |
| 4,456,242 A | * | 6/1984 | Morin ...................... B65H 3/32 |
| | | | 271/104 |
| 5,534,063 A | | 7/1996 | Maruyama et al. |
| 5,548,388 A | | 8/1996 | Schieck |
| 2001/0033356 A1 | * | 10/2001 | Yanagawa ............. G02F 1/1339 |
| | | | 349/153 |
| 2004/0011623 A1 | * | 1/2004 | Sala .................. B65G 47/1471 |
| | | | 198/373 |
| 2008/0271344 A1 | * | 11/2008 | Skirrow ................... C14B 7/04 |
| | | | 36/114 |

FOREIGN PATENT DOCUMENTS

| | | |
|---|---|---|
| EP | 1155983 A1 | 11/2001 |
| JP | 2001121054 A | 5/2001 |

\* cited by examiner

VACUUM ENABLED ARTICLE TRANSFER

CROSS-REFERENCE TO RELATED APPLICATIONS

This application is a continuation of co-pending U.S. patent application Ser. No. 14/463,115, filed Aug. 19, 2014, entitled "VACUUM ENABLED ARTICLE TRANSFER," which claims the benefit of U.S. Provisional Application No. 62/031,383, filed Jul. 31, 2014, and entitled "VACUUM ENABLED ARTICLE TRANSFER." Each of the above-identified applications is hereby incorporated by reference in its entirety.

BACKGROUND

After applying a material, such as a hot-melt adhesive, to an article, the article may need to be transferred to another process or mechanism. However, a conveyance mechanism (e.g., traditional gravity aided conveyor belt) that contacts a surface (e.g., article bottom surface) to which the material was applied may interfere with the intended coverage of the material. The conveyance mechanism may also become coated in the material as the material transfers from the article to the conveyance mechanism, which can lead to inefficiencies in material usage and down time of the conveyance mechanism.

SUMMARY

Embodiments of the present invention relate to systems and methods for applying a material to an article using a vacuum enabled article transfer mechanism. A belt having a plurality of apertures extending there through is effective to pass a vacuum pressure from a vacuum chamber through the belt to an article to be conveyed. The belt moves relative to the vacuum chamber such that as the article is temporarily adhered to the belt, the article is conveyed. The vacuum enabled article transfer apparatus includes a conveyance belt having a plurality of apertures extending through a contacting surface to an opposite inner surface of the conveyance belt; a compression roller; a second roller, wherein the conveyance belt forms a continuous loop around the compression roller and the second roller such that the belt inner surface is in contact with the compression roller and the second roller; and a vacuum distribution chamber, the chamber positioned between the compression roller and the second roller within the loop of the conveyance belt, wherein the chamber is comprised of an engagement surface proximate the belt inner surface and effective for directing a vacuum pressure through the belt at the plurality of apertures.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects herein are directed to a vacuum enabled article transfer apparatus that includes a conveyance belt having a plurality of apertures extending through a contacting surface to an opposite inner surface of the conveyance belt. The apertures allow for the flow of air through the belt such that when a negative pressure (i.e., vacuum) is applied to the inner surface of the belt, the negative pressure causes a flow of air through the belt. This negative pressure is effective to temporarily adhere an article to the belt while the vacuum is applied to the belt relative to the article. The vacuum enabled article transfer apparatus also includes a compression roller and a second roller. The conveyance belt forms a continuous loop around the compression roller and the second roller such that the belt inner surface is in contact with the compression roller and the second roller. The vacuum enabled article transfer apparatus also has a vacuum distribution chamber. The chamber is positioned between the compression roller and the second roller within the loop of the conveyance belt. The chamber is comprised of an engagement surface proximate the belt inner surface and effective for directing a vacuum pressure through the belt at the plurality of apertures. In combination, the elements of the vacuum enabled article transfer apparatus allows for a conveyance of an article by contacting a surface on which the applied material was not applied.

Figure 1:
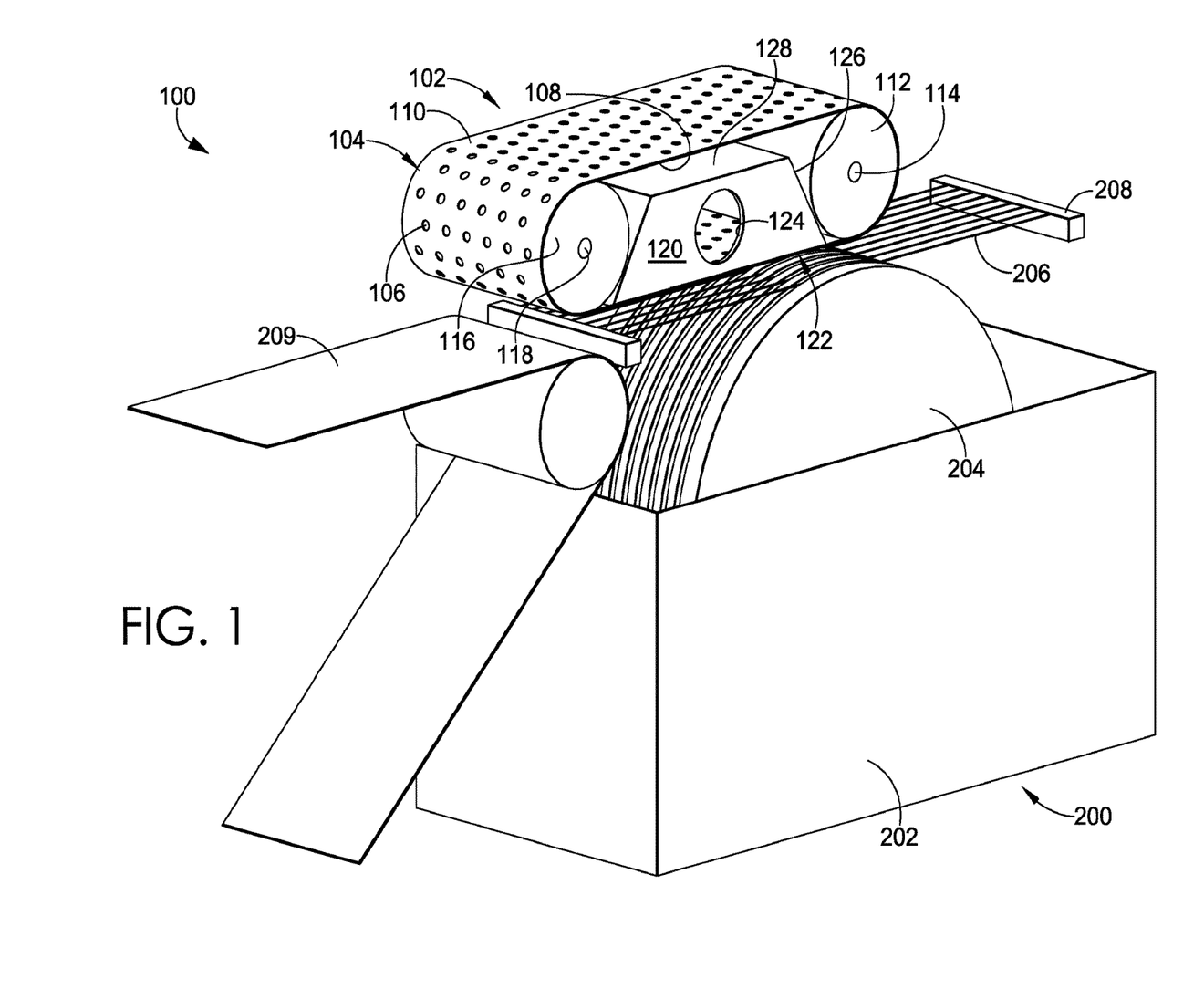
FIG. 1 depicts a system having an exemplary vacuum enabled article transfer apparatus, in accordance with aspects hereof.

FIG. 1 depicts a system 100 having an exemplary vacuum enabled article transfer apparatus 102, in accordance with aspects hereof. In particular, vacuum enabled article transfer apparatus 102 is comprised of a conveyance belt 104, a compression roller 112, a second roller 116, and a vacuum chamber 120. Not depicted in FIG. 1, but contemplated, the vacuum enabled article transfer apparatus 102 may also be comprised of a vacuum source (e.g., vacuum generator) in fluid communication with the vacuum chamber 120.

The conveyance belt 104 is flexible material, such as silicone, formed into a loop. The conveyance belt is comprised of a contacting surface 110 and an inner surface 108. The contacting surface 110 is outward facing such that an article that is intended to be conveyed by the conveyance belt 104 is in contact with the contacting surface 110. The contacting surface, in an exemplary aspect, may be treated with one or more surface treatments (e.g., ant-stick) to provide a suitable surface for repeated contact with one or more articles. The inner surface 108 is inwardly facing such that the inner surface 108 contacts the compression roller 112 and the second roller 116.

The conveyance belt 104 is comprised of a plurality of apertures 106 extending through the conveyance belt 104. For example, each of the plurality of apertures 106 extend through the inner surface 108 and the contacting surface 110 such that a vacuum pressure introduced proximate the inner surface 108 is fluidly communicated through the conveyance belt 104 to an article proximate (e.g., near) the contacting surface 110. The plurality of apertures 106 may be any size (or combination of sizes), any shape (or combination of shapes), and in any configuration (or combination of configurations). In an exemplary aspect, it is contemplated that an aperture of the plurality of apertures 106 is circular in shape and has a diameter within a range of 2 mm to 14 mm that are arranged in a repeating and substantially regular pattern with a first row (or column) offset from a second row (or column). However, it is contemplated that any combination of size, shape, and configuration may be implemented in aspects hereof.

The conveyance belt 104 forms a loop around at least the compression roller 112 and the second roller 116. A void is formed between the compression roller 112 and the second roller 116 and also between an upper portion and a lower portion of the conveyance belt 104. Within this void, the vacuum chamber 120 may be positioned. As will be discussed in greater detail, it is contemplated that the vacuum chamber 120 may be positioned such that at least a first side 126 extends along (e.g., tangentially) the compression roller 112 such that an engagement surface 122 of the vacuum chamber 120 is positioned close to a location at which the conveyance belt 104 breaks contact with the compression roller 112.

The vacuum chamber 120 structural components (e.g., engagement surface 122, inlet 124, first side 126, and top surface 128) will be discussed in greater detail hereinafter, such as in connection with FIGS. 3, 5, and 6.

The compression roller 112 has an axis of rotation 114 and the second roller has an axis of rotation 118. FIG. 1 does not depict a structure supporting and maintaining the components of the vacuum enabled article transfer apparatus 102 in order to illustrate their relative placement; however, one of ordinary skill can appreciate that one or more structural members may be implemented to maintain a location and relative position of the various components discussed herein. For example, a structural member may extend between the axis of rotation 114 and the axis of rotation 118 to maintain a desired tension on the conveyance belt 104, for example. Also not depicted but contemplated, a drive components (e.g., motor and control) operable for moving the conveyance belt 104 around the compression roller 112 and the second roller 116, in an exemplary aspect.

The system 100 is also comprised of an adhesive applicator 200, in the depicted exemplary aspect. While the term "adhesive" is used in the following discussion of applicator 200, it is contemplated that the applicator 200 may be effective for applying any surface treatment (e.g., water repellant, sealant, dye, paint, and the like). Therefore, while an adhesive is discussed in specific aspects herein, it is contemplated that other surface treatments may alternatively be applied.

The adhesive applicator 200 is comprised of an adhesive vessel 202 and an applicator roller 204. It is contemplated that the applicator roller is effective to pass through a material (e.g., adhesive) that is maintained within the adhesive vessel 202 such that as an article is passed over and in contact with the applicator roller 204, the material is transferred to the contacting surface of the article. For example, it is contemplated that the adhesive containing vessel may contain an adhesive (e.g., hot melt, heat activated) that temporarily resides on a surface of the applicator roller 204 as the applicator roller 204 spins through the adhesive. This allows the adhesive to be transported out of the adhesive containing vessel 202 and to be applied to a surface of an article, such as an article used in the formation of an article of footwear (e.g., shoe).

The applicator roller 204, which may be formed from a metallic material, may be heated in an exemplary aspect. The thermal energy from the applicator roller 204 in this example may be effective for maintaining a hot-melt adhesive material in a non-cured state such that the adhesive material may be transferred to the article. It is further contemplated that the adhesive applicator 200 may be comprised of drive components (not illustrated) effective to rotate the applicator roller 204. Further, it is contemplated that a heat generating component may also be included that is effective for maintaining the temperature of the material at or above a melting temperature, such as within a range of 75 to 240 degrees Celsius, in an exemplary aspect.

The system 100 is also comprised of a plurality of filaments 206, in an exemplary aspect. The plurality of filaments may be formed from any suitable material, such as a metallic material. The plurality of filaments 206 may extend across the applicator roller 204 providing a surface plane to effectively guide an article over a surface of the applicator roller 204. Additionally, it is contemplated that the plurality of filaments 206 are effective for dislodging (or ensuring dislodgement) of an article from the surface of the applicator roller 204 after applying the material. The plurality of filaments, in an exemplary aspect, may be heated by an energy source 208 such that a hot-melt adhesive is maintained above a melting temperature on the plurality of filaments 206, which may reduce a buildup of the hot-melt adhesive thereon.

It is contemplated that the plurality of filaments 206 may extend in a plane substantially parallel with a plane in which the conveyance belt 104 extends between the compression roller 112 and the second roller 116. It is further contemplated that the plurality of filaments 206 may extend away from the conveyance belt 104 following the start of the vacuum chamber 120 after the compression roller 112. In this example, the vacuum enabled article transfer apparatus 102 is effective for conveying and supporting the article without the assistance of the plurality of filaments 206. Separating the article from the filaments while still conveying the article by the vacuum enabled article transfer apparatus 102 may be advantageous in aspects to allow the applied material (e.g., hot-melt adhesive) to cure (e.g., cool) without the physical contact of a bottom-supporting plurality of filaments 206.

The system may also be comprised of a secondary conveyance 209, in an exemplary aspect. For example, the secondary conveyance may transport an article following the conveyance of the vacuum enabled article transfer apparatus 102. For example, the vacuum enabled article transfer apparatus 102 may convey (or maintain) the article for a sufficient time to allow the applied material to cure to a degree that the applied material on the article may be contacted by a surface of the secondary conveyance 209. In an exemplary aspect, the secondary conveyance is a belt-like structure that has an anti-stick characteristic.

Figure 2:
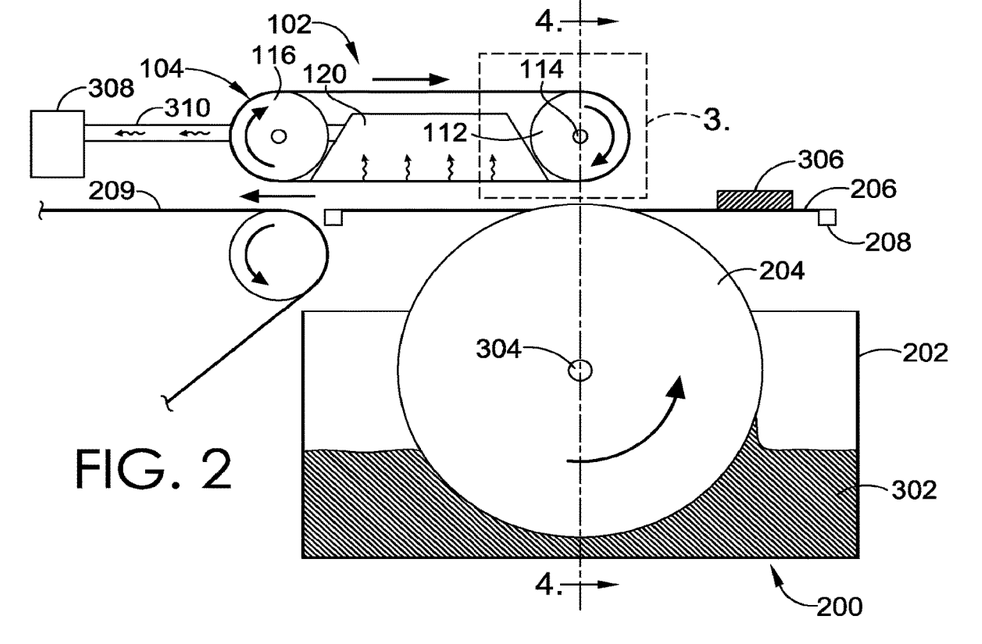
FIG. 2 depicts an exemplary cross-sectional perspective of a system, such as the system of FIG. 1, in accordance with aspects hereof.

FIG. 2 depicts an exemplary cross-sectional perspective of a system, such as the system 100 of FIG. 1, in accordance with aspects hereof. The system of FIG. 2 is comprised of the vacuum enabled article transfer apparatus 102 and the adhesive applicator 200 discussed in FIG. 1. Similarly numbered elements of FIG. 2 relate to the corresponding elements discussed with respect to FIG. 1.

Specifically depicted in FIG. 2 is a vacuum source 308 that is fluidly coupled/connected by way of connector 310 with the vacuum chamber 120. The vacuum source 308 may be any vacuum source, such as an electrically driven, pneumatic driven, and/or hydraulic driven generator of vacuum pressure, a negative (reduced) pressure relative to atmospheric pressure. The connector 310 is illustrated for exemplary purposes and is not limiting in nature. It is contemplated that the connector may be of any size, shape, and/or position.

As depicted, the conveyance belt 104 and the engagement surface of the vacuum chamber 120 are in a contacting relationship, in the illustrated example. This contacting relationship allows for a seal-like bond to occur between the sliding conveyance belt 104 and the vacuum chamber 120 to ensure a sufficient amount of vacuum pressure is transferred through the belt 104 to the article 306 when being conveyed. If a gap existed between the conveyance belt 104 and the vacuum chamber 120, an insufficient amount of vacuum pressure may be transmitted through the conveyance belt 104 to effectively adhere the article 306 to the belt for conveyance, in an exemplary aspect.

The adhesive containing vessel 202 is depicted containing a material 302, such as a hot-melt adhesive. The applicator roller 204 rotates through the material 302 such that a portion of the material 302 is transferred on the surface of the applicator roller 204 to an article, such as an article 306, as the article passes between the applicator roller 204 and the compression roller 112. To achieve a controlled exit of the article and an even application of material on to the article from between the compression roller 112 and the applicator roller 204, it is contemplated that a plane passing through the axis of rotation 114 and an axis of rotation 304 is aligned perpendicular to a plane defined by the conveyance belt 104 extending between the compression roller 112 and the second roller 116, in an exemplary aspect.

Said plane extending between the axis of rotations for the compression roller 112 and the applicator roller 204 is also identified as cutline 4-4, which represents a cross sectional perspective for FIG. 4 hereinafter. Also, a highlighted region is depicted around the vacuum chamber 120 and the compression roller 112, which is magnified in FIG. 3 hereinafter.

Figure 3:
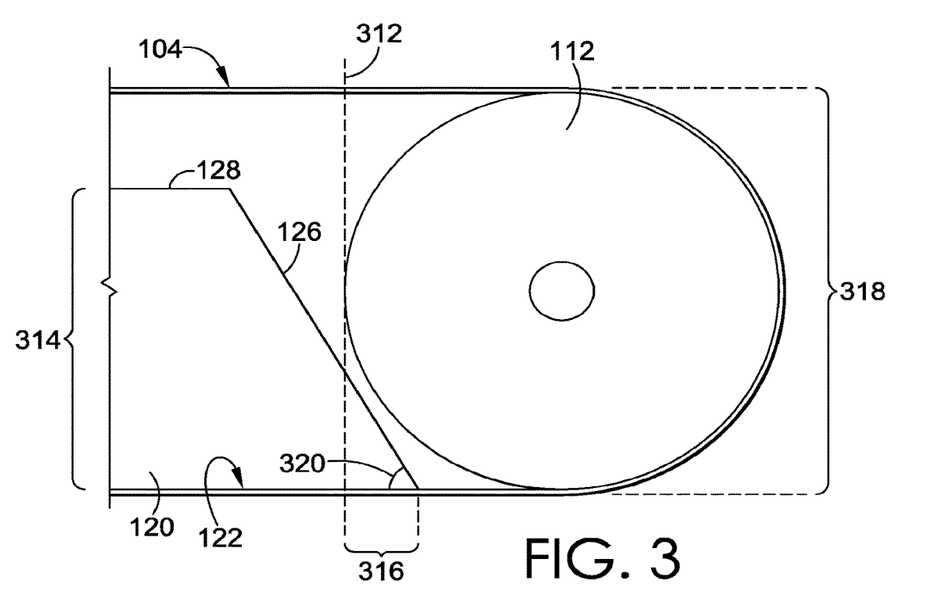
FIG. 3 depicts a focused cross-section of the vacuum chamber, the compression roller, and the conveyance belt, in accordance with aspects hereof.

FIG. 3 depicts a focused cross-section of the vacuum chamber 120, the compression roller 112, and the conveyance belt 104, in accordance with aspects hereof. Similarly numbered elements of FIG. 3 relate to the corresponding elements discussed with respect to FIGS. 1 and 2.

FIG. 3 depicts the vacuum chamber 120 extending between the compression roller 112 and the conveyance belt 104 proximate a location where the conveyance belt 104 separates from contacting the compression roller 112. For example, the vacuum chamber 120 extends between the compression roller 112 and the belt 104 a lateral distance represented by distance 316, which is measured from a vertical tangent 312 to the intersection of the engagement surface 122 and the first side 126. The distance 316 enhances the ability of the vacuum chamber 120 to acquire and adhere to the article following the application of a material (e.g., hot-melt adhesive). An acute angle 320 is formed between the engagement surface 122 and the first side 126. The acute angle allows for the vacuum chamber 120 to extend a greater distance 316 than a vacuum chamber having a similar height with a less acute angle, which aids in the acquisition of the article by the vacuum chamber 120, in an exemplary aspect.

Additionally depicted in FIG. 3, a diameter 318 of the compression roller 112 is greater than a height 314 of the vacuum chamber 120. This difference in height allows at least a portion of the vacuum chamber 120 to be positioned between a top portion and a bottom potion of the loop formed by the conveyance belt 104. This allows the vacuum chamber to remain stationary as the conveyance belt is operable to rotate (e.g., move) around the vacuum chamber. In this manner, potential complications with moving the vacuum source and/or vacuum chamber 120 may be avoided by instead moving the conveyance belt around the fixed vacuum chamber 120 to move an article.

Figure 4:
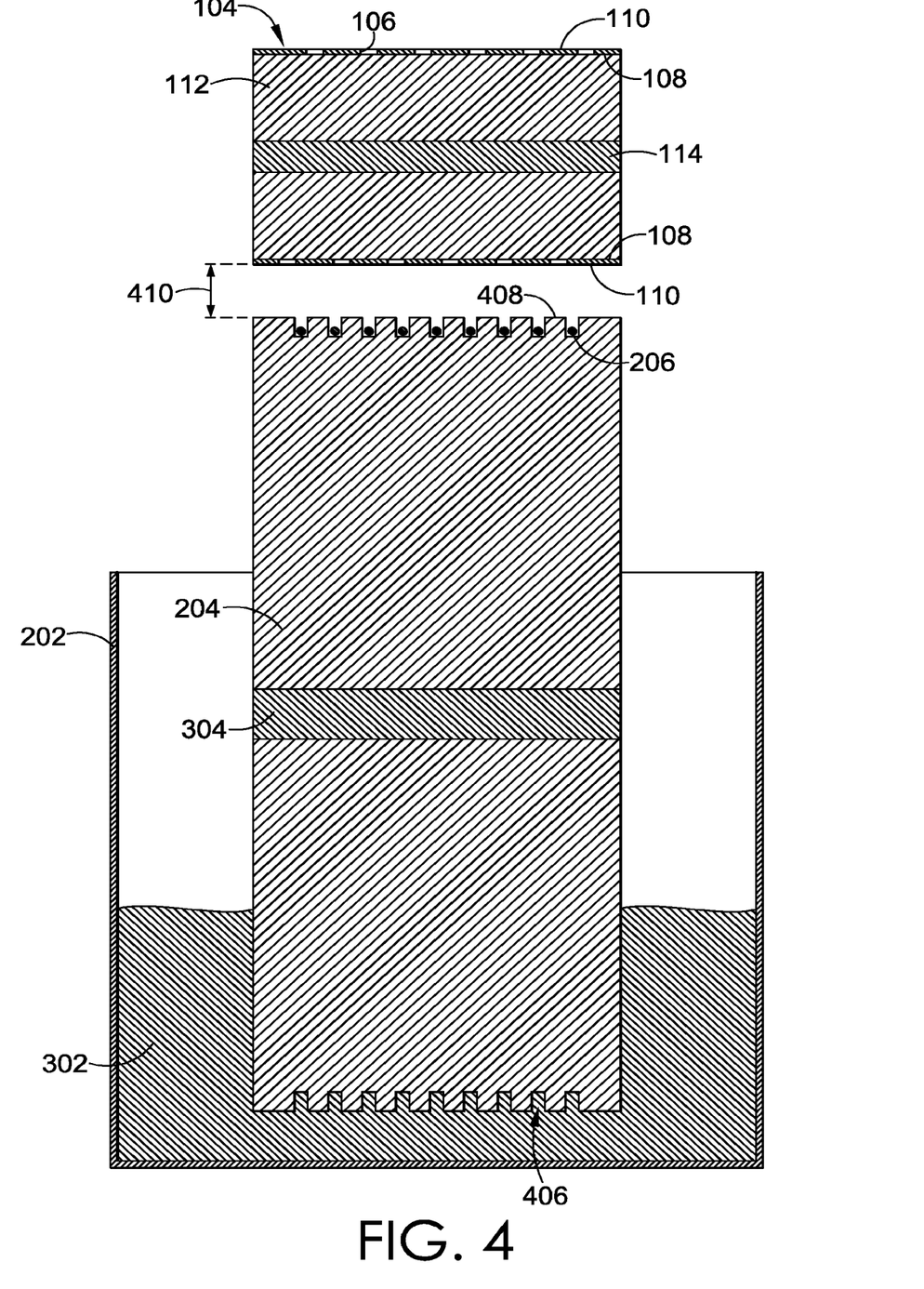
FIG. 4 depicts a cross section along cut line 4-4 of FIG. 2, in accordance with aspects hereof.

FIG. 4 depicts a cross section along cut line 4-4 of FIG. 2, in accordance with aspects hereof. Similarly numbered elements of FIG. 4 relate to the corresponding elements discussed with respect to FIGS. 1 and 2.

The conveyance belt 104 is depicted having the plurality of aperture 106 extending through both the contacting surface 110 and the inner surface 108. As such, it is contemplated that a vacuum pressures experienced proximate the inner surface 108 transfers through the belt 104 to an article near the contacting surface 110.

The applicator roller 204 is depicted having a plurality of grooves 406 effective to receive and maintain the plurality of filaments 206. The grooves 406 allow for recces of the filaments 206 such that an outer surface 408 of the applicator roller 204 extends beyond the filaments 206 as recessed in the grooves 406. The extension of the outer surface 408 allows contact between the applicator roller 204 and the article to occur with limited interference from the filaments 206. Stated differently, without the outer surface 408 extending beyond the plurality of filaments 206 at the applicator roller 204, an effective transfer of material (e.g., hot-melt adhesive) may not occur between the applicator roller 204 and the article, in an exemplary aspect.

A compression height 410 is depicted as extending between the contacting surface 110 of the conveyance belt 104 and the outer surface 408 of the applicator roller 204. The compression height 410 may be adjusted by raising/lowering one or more of the elements provided herein. In an exemplary aspect, the compression height 410 is from 85% to 100% a thickness of the article to be passed there through. Stated differently, it is contemplated that the compression height 410 is within 15% the height of an article onto which a material is to be applied. This compression height 410 allows a desired amount of compression to be applied to the article to ensure an appropriate and sufficient application of material is achieved.

While FIG. 4 illustrates exemplary configurations of elements, it is understood that any configuration, size, shape, and relative position may be used. For example, while the grooves 406 are depicted as being uniform in nature, it is contemplated that a higher concentration of grooves may be positioned in a primary working zone, in an exemplary aspect. Further, while an exemplary size, shape, and position of the apertures 106 are depicted, it is contemplated that alternative may be implemented. Further, while a width of the compression roller 112 and the applicator roller 204 are depicted as being substantially similar, it is contemplated that different widths and sizes may be implemented.

Figure 5:
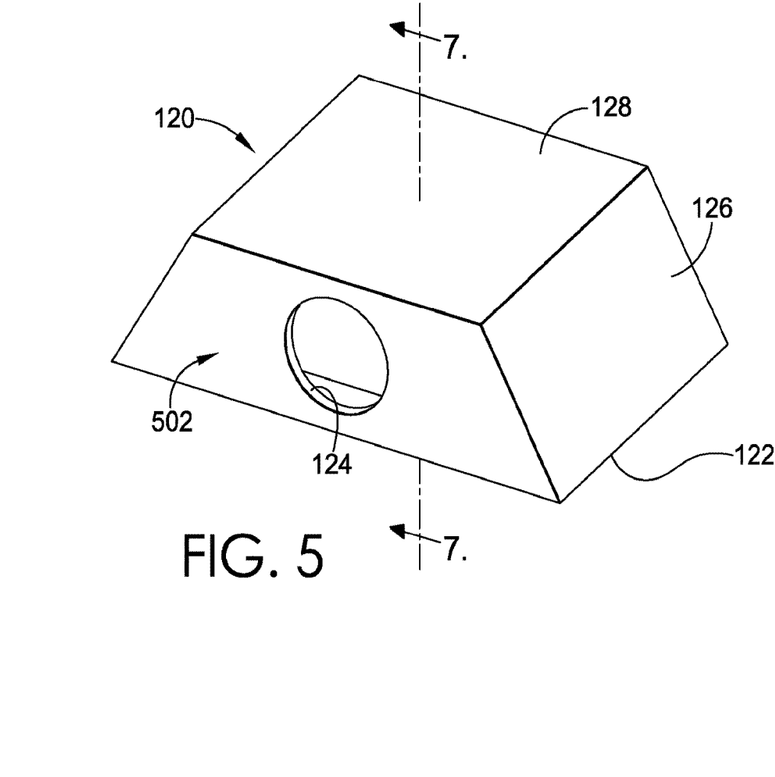
FIG. 5 depicts an isometric perspective of the vacuum chamber, in accordance with aspects hereof.

FIG. 5 depicts an isomeric perspective of the vacuum chamber 120, in accordance with aspects hereof. Similarly numbered elements of FIG. 5 relate to the corresponding elements discussed with respect to FIG. 1. The vacuum chamber 120 is comprised of the top surface 128, the first side 126, the engagement surface 122, the inlet 124, and a front face 502. The inlet 124 serves as a connection port for fluidly coupling an internal volume of the vacuum chamber 120 with a vacuum source. It is contemplated that additional inlets may be implemented to allow for the coupling or distribution of additional vacuum pressure. Also depicted in FIG. 5 is a cut line 7-7 that will represent the cross section of FIG. 7 hereinafter.

Figure 6:
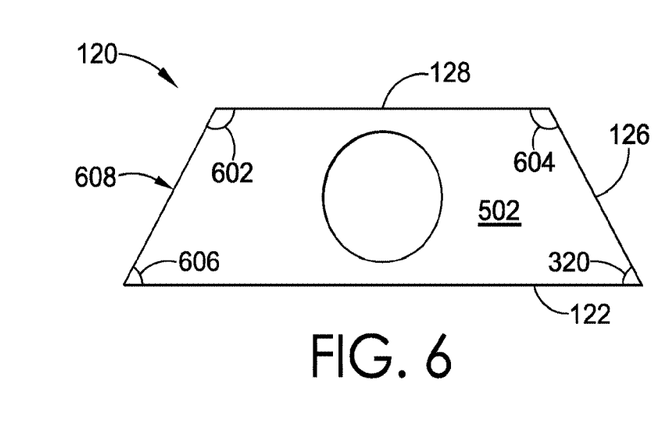
FIG. 6 depicts the front face of the vacuum chamber, in accordance with aspects hereof.

FIG. 6 depicts the front face 502 of the vacuum chamber 120, in accordance with aspects hereof. In particular, FIG. 6 highlights a trapezoidal configuration of the front face 502 that is effective to extend the engagement surface 122 between the compression roller 112 and the conveyance belt of FIG. 2. The trapezoidal shape of the front face 502 is also effective, in an exemplary aspect, to extend engagement surface 122 between the second roller 116 and the conveyance belt 104 of FIG. 2. While the first side 126 and a second side 608 are depicted as being linear in nature, it is contemplated that an arc or curve may be applied to better conform to the contours of the respective proximal rollers of each side. The formation of the trapezoidal front face 502 results in obtuse angles 602 and 604 as well as acute angles 606 and 320. As previously discussed, the acute angles 320 and 606 ma allow for a greater inclusion of the engagement surface 122 between a roller and the conveyance belt to increase an area of the conveyance belt for which vacuum pressure is applied/transmitted.

Figure 7:
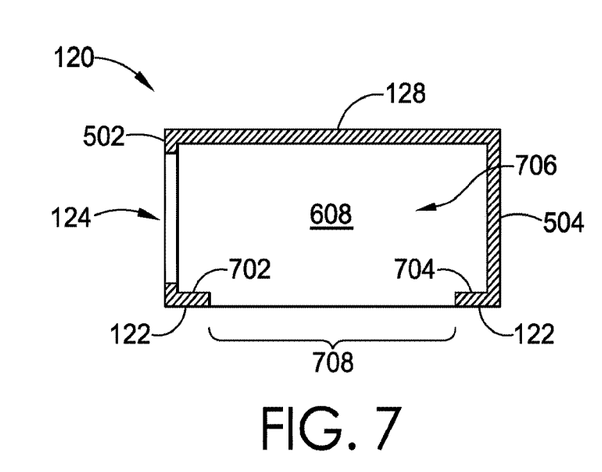
FIG. 7 depicts a cross section of the vacuum chamber extending from the front face to a back face, in accordance with aspects hereof.

FIG. 7 depicts a cross section of the vacuum chamber 120 extending from the front face 502 to a back face 504, in accordance with aspects hereof. FIG. 7 depicts an internal volume 7006 that is substantially bounded by the top surface 128, the front face 502, the back face 504, the second side 608, the first side 126 (not depicted in the cut view), and the engagement surface 122. As depicted, the engagement surface is expanded with an extension 702 from the front face 502 and an extension 704 from the back face 504. The extensions 702 and 704 may extend from the respective faces any length to result in an engagement surface aperture 708 through which vacuum pressure is transferred through a conveyance belt. For example, if a conveyance belt is narrower than the width between the front face 502 and the back face 504, the extensions 702 and/or 702 may be formed to concentrate that engagement surface aperture 708 over a serviceable portion of the conveyance belt, in an exemplary aspect. Further, it is contemplated that the extensions 702 and 704 may be omitted altogether, such as when the front face 502 and the back face 504 have a separation approximate that of a serviceable region of an underlying conveyance belt.

Figure 8:
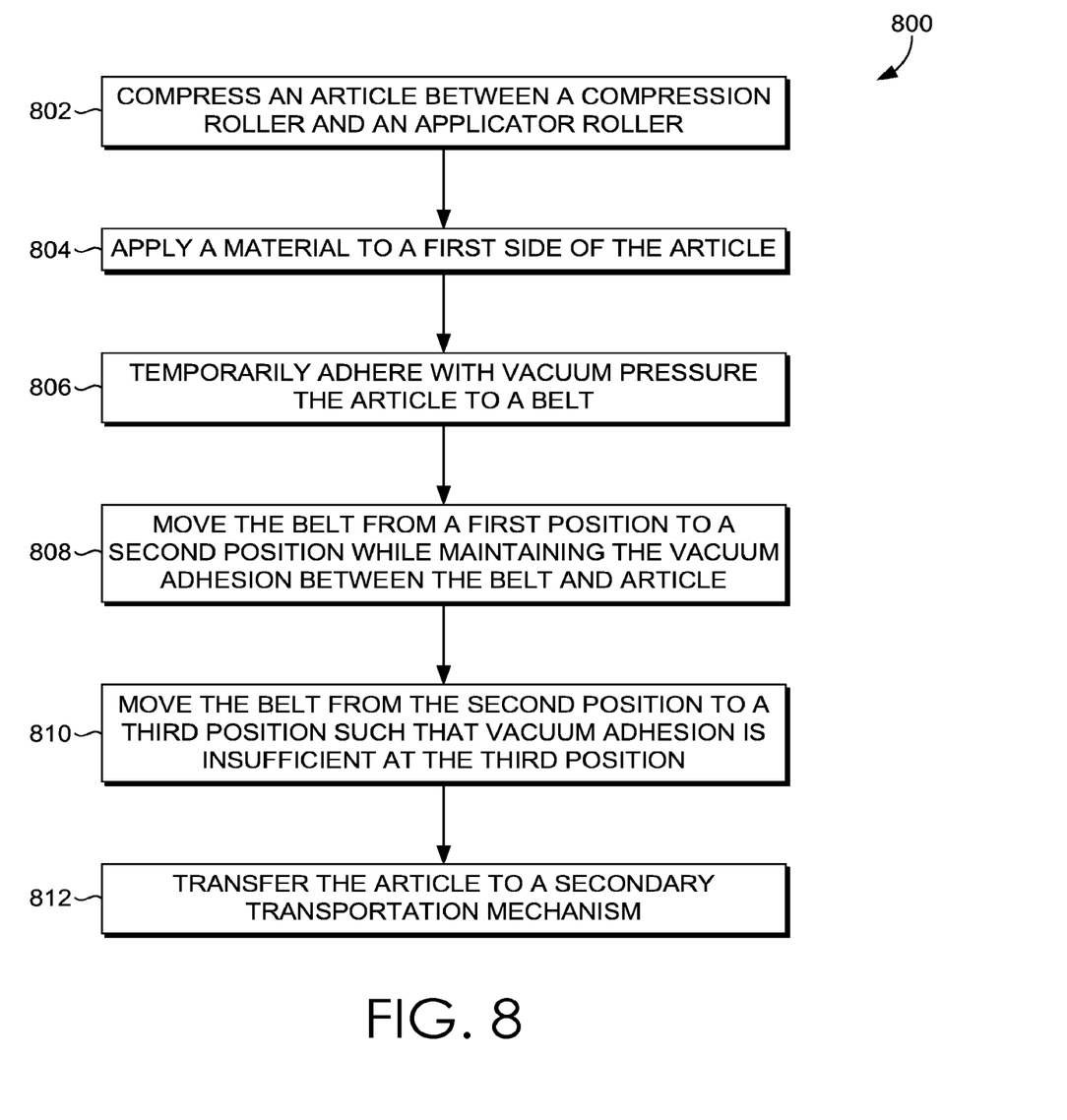
FIG. 8 depicts a flow diagram illustrating a method for transferring an article using at least a vacuum enabled article transfer apparatus, in accordance with aspects hereof.

FIG. 8 depicts a flow diagram 800 illustrating a method for transferring an article using at least a vacuum enabled article transfer apparatus, in accordance with aspects hereof. At a block 802, a step of compressing an article between a compression roller and an applicator roller is provided. For example, it is contemplated that an article, such as a portion of material to use in the formation of an article of apparel or footwear may be fed between counter rotating compression roller and applicator roller having a compression height equal to or less than the thickness of the article. The counter rotation of the spaced apart rollers is effective to move the article between the rollers.

At a block 804, a step of applying a material to a first side of the article is provided. For example, it is contemplated that the applicator roller of block 802 is a carrier of the material, such as a hot-melt. Such that the compression of the article in block 802 aids in a transfer of material from the applicator roller to the article such that the material is applied to the surface of the article in contact with the applicator roller.

At a block 806, a step of temporarily adhering, with vacuum pressure, the article to a belt is provided. For example, when vacuum pressure is applied within a vacuum chamber that is in fluid communication with a belt having apertures extending through the belt, the vacuum pressure passes through the belt to the article to create a negative pressure attraction force effective for adhering the article to the belt. This adhesion is temporary in that the adhesion is effective only while the negative pressure is applied through the belt. Therefore, as the belt move out of a region supplying the vacuum pressure or as the vacuum pressure is removed, the adhesion of the article to the belt is also eliminated.

At a block 808, a step of moving the belt from a first position to a second position while maintaining the vacuum adhesion between the belt and article is provided. For example, as a belt slidably traverses a vacuum pressure zone, such as one provided by a vacuum chamber, the article moves from a first position to a second position. This movement may allow the entirety of the article to have material applied to the first side, as provided in block 804 while limiting contact of the first side with a supporting structure as the article moves.

At a block 810, a step of moving the belt from the second position to a third position such that the vacuum adhesion adhering the article to the belt is insufficient to maintain the adhesion at the third position. For example, as the belt slides beyond a vacuum pressure region of a vacuum chamber, a vacuum pressure sufficient to adhere the article to the belt is no longer present. At the third position, the belt is no longer sufficient for conveying the article as the article is no longer adhered to the belt.

At a block 812, a step of transferring the article to a secondary transportation mechanism is provided. The secondary transportation mechanism may be a conveyance belt that contacts the first side of the article. However, the vacuum enabled article transfer apparatus may have maintained the article for a time sufficient to limit the transfer of applied material from the article to the second transportation mechanism, in an exemplary aspect.

While specific reference in FIG. 8 is made to one or more steps, it is contemplated that one or more additional or alternative steps may be implemented while achieving aspects provided herein. As such, blocks may be added or omitted while still staying within the scope hereof.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A method of transferring an article, the method comprising:
   receiving an article at a position on a vacuum enabled article transfer apparatus;
   applying a material to a first side of the article, wherein the material applied to the first side is an adhesive, wherein the applying comprises contacting the first side of the article with at least a portion of an adhesive applicator, the adhesive applicator comprising an applicator roller and an adhesive containing vessel, the applicator roller rotatably positioned at least partially within the adhesive containing vessel, wherein the adhesive applicator further comprises a plurality of transfer filaments, the plurality of transfer filaments extending between the applicator roller and a conveyance belt;
   temporarily adhering, with a vacuum pressure, the article to the conveyance belt, wherein the conveyance belt is in contact with a second side of the article, the second side is opposite of the first side;
   while maintaining the vacuum adhesion of the article to the conveyance belt, moving the conveyance belt from a first position to a second position; and
   moving the conveyance belt from the second position to a third position, such that at the third position the vacuum adhesion is insufficient to counteract a force of gravity on the article such that the article is no longer adhered to the conveyance belt by vacuum adhesion.

2. The method of claim 1, wherein the conveyance belt is comprised of a plurality of apertures extending there through for allowing a transfer of vacuum pressure through the conveyance belt to the article.

3. The method of claim 1, wherein the third position of the conveyance belt is a location beyond a vacuum chamber applying the vacuum pressure.

4. The method of claim 1, further comprising transferring the article from the conveyance belt to a secondary transport mechanism, wherein the secondary transport mechanism is in contact with the first side of the article.

5. The method of claim 1, further comprising applying thermal energy to the plurality of transfer filaments so that the plurality of transfer filaments are maintained above a threshold temperature.

6. The method of claim 5, wherein the threshold temperature is a temperature within the range of 75° C. to 240° C.

7. A method of transferring an article, the method comprising:
   utilizing a conveyance belt to transfer an article from a first position to a second position, the article having opposing first and second sides, wherein the second side of the article is in contact with at least a portion of the conveyance belt, and wherein the conveyance belt is coupled to a vacuum distribution chamber;
   applying a material to the first side of the article, the material comprising an adhesive, wherein the applying comprises contacting the first side of the article with an adhesive applicator, the adhesive applicator comprising an applicator roller and an adhesive containing vessel, the applicator roller rotatably positioned at least partially within the adhesive containing vessel, wherein the adhesive applicator further comprises a plurality of transfer filaments, the plurality of transfer filaments extending between the applicator roller and the conveyance belt, and wherein the contacting the first side of the article with the adhesive applicator comprises contacting the first side of the article with: the applicator roller; at least a portion of the plurality of transfer filaments; or a combination thereof; and
   transferring the article from the second position to a third position such that at the third position the first side of the article is in contact with a secondary transport mechanism and the second side of the article is no longer adhered to the conveyance belt.

8. The method of claim 7, further comprising applying thermal energy to the plurality of transfer filaments so that the plurality of transfer filaments are maintained above a threshold temperature.

9. The method of claim 8, wherein the threshold temperature is a temperature within the range of 75° C. to 240° C.

10. The method of claim 7, wherein at least a portion of the plurality of transfer filaments are positioned below an outer surface of the applicator roller.

11. The method of claim 7, wherein the plurality of transfer filaments extend, at least partially, in a plane substantially parallel with a plane in which at least a portion of the conveyance belt extends between a first roller and a second roller.

12. The method of claim 7, wherein the vacuum distribution chamber is positioned between a first roller and a second roller, and wherein the conveyance belt forms a loop around the first roller and the second roller.

13. The method of claim 7, wherein the conveyance belt is comprised of a plurality of apertures extending there through for allowing a transfer of vacuum pressure through the conveyance belt to the article.

14. The method of claim 7, wherein the article comprises at least a portion of an article of footwear.

* * * * *